US008281496B1

(12) United States Patent  (10) Patent No.: US 8,281,496 B1
Mies  (45) Date of Patent: Oct. 9, 2012

(54) MULTI-FUNCTION ELECTRICIAN LEVEL

(76) Inventor: Greg Mies, Fond du Lac, WI (US)

( * ) Notice: Subject to any disclaimer, the term of this patent is extended or adjusted under 35 U.S.C. 154(b) by 4 days.

(21) Appl. No.: 13/175,304

(22) Filed: Jul. 1, 2011

Related U.S. Application Data

(60) Provisional application No. 61/361,471, filed on Jul. 5, 2010.

(51) Int. Cl.
*G01C 9/24* (2006.01)
(52) U.S. Cl. ..................... 33/381; 33/DIG. 10
(58) Field of Classification Search ............ 33/354, 33/381, 382, 528, DIG. 10
See application file for complete search history.

(56) References Cited

U.S. PATENT DOCUMENTS

| 3,116,563 | A | * | 1/1964 | Gelbman | 33/354 |
| 3,279,080 | A | | 10/1966 | Stepshinski | |
| 5,222,303 | A | * | 6/1993 | Jardine | 33/528 |
| 5,505,001 | A | | 4/1996 | Schaver, Jr. | |
| 5,813,130 | A | | 9/1998 | MacDowell | |
| 6,003,234 | A | | 12/1999 | Seibert | |
| 6,209,214 | B1 | * | 4/2001 | Talavera | 33/528 |
| 6,434,848 | B1 | * | 8/2002 | Gordon et al. | 33/528 |
| 6,818,824 | B1 | | 11/2004 | Marcou et al. | |
| 7,032,297 | B2 | | 4/2006 | Cahill et al. | |
| 2008/0022543 | A1 | * | 1/2008 | Kesler | 33/645 |
| 2010/0095543 | A1 | * | 4/2010 | Inthavong | 33/528 |
| 2012/0096724 | A1 | * | 4/2012 | Eyermann et al. | 33/354 |

* cited by examiner

*Primary Examiner* — G. Bradley Bennett
(74) *Attorney, Agent, or Firm* — Brannen Law Office, LLC

(57) ABSTRACT

The present invention relates to a multi-function electrician level. In one embodiment, the body has a first face enabling the tool to level either a switch or a dual three-prong outlet. A second face can be used to level a rectangular outlet, such as a GFCI outlet. In this regard, the second face can have depressions providing clearance to reset buttons. Both faces have walls that mate with the respective type of outlet. The tool can also be used as a traditional level. Levels are provided on two perpendicular surfaces, and are observable through both faces. A laser projector can be provided for fanning a leveling line outward from the tool. A light such as a LED light can also be provided for use as a flashlight. The light can also illuminate the levels.

20 Claims, 6 Drawing Sheets

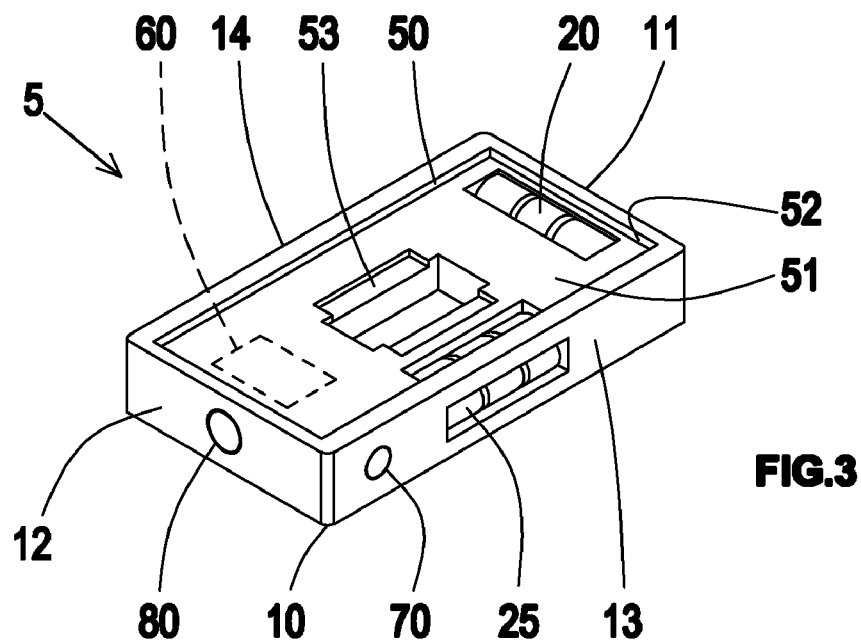
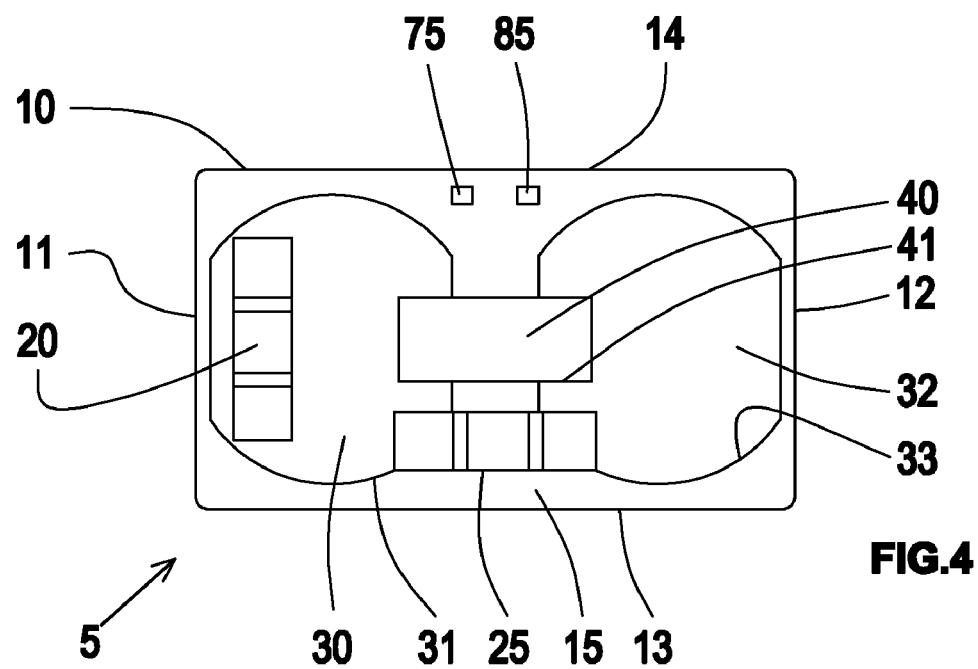

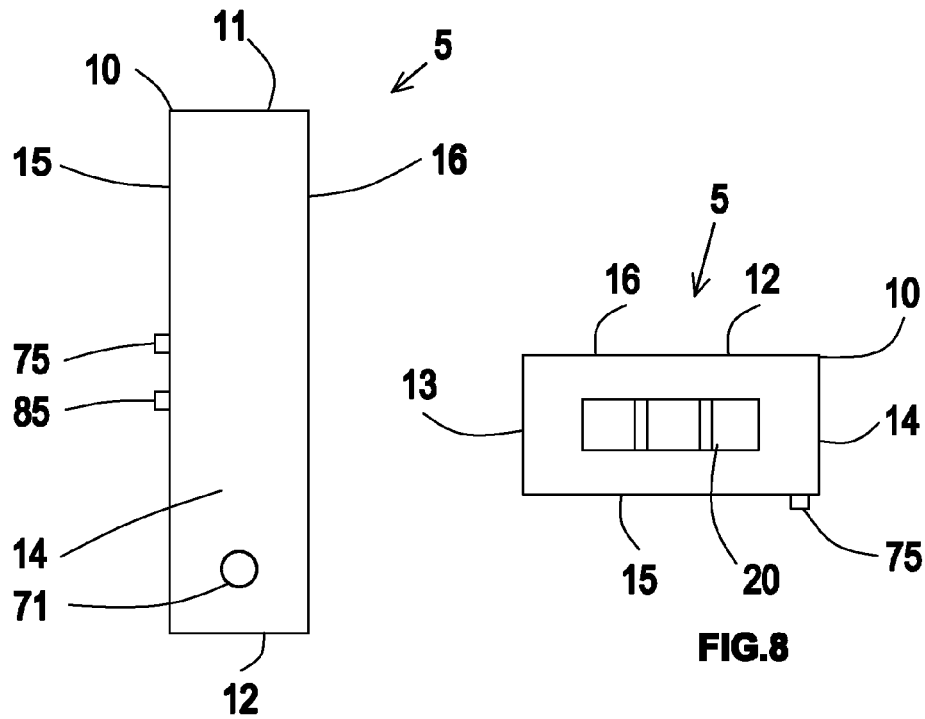
FIG.7
FIG.8
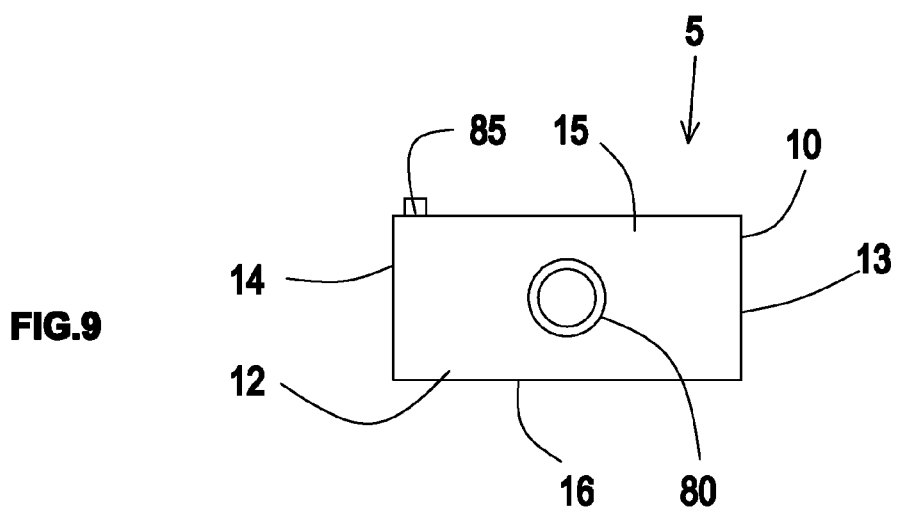
FIG.9

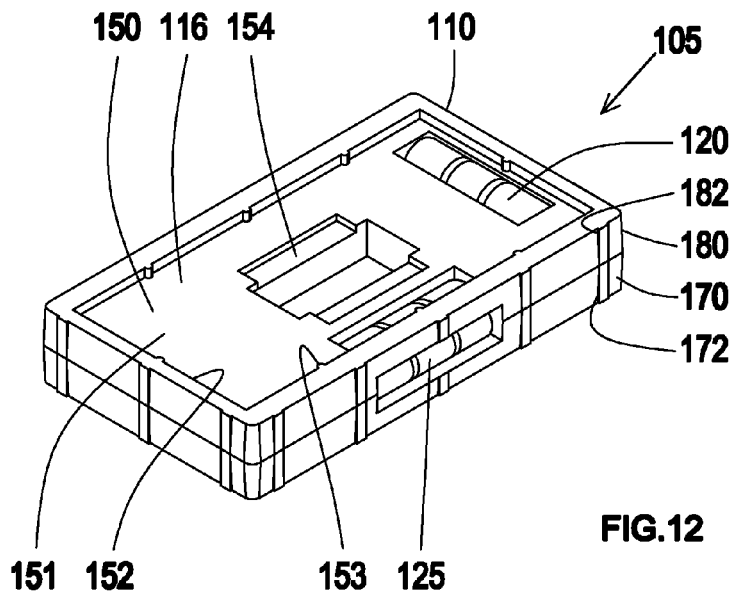
FIG.12
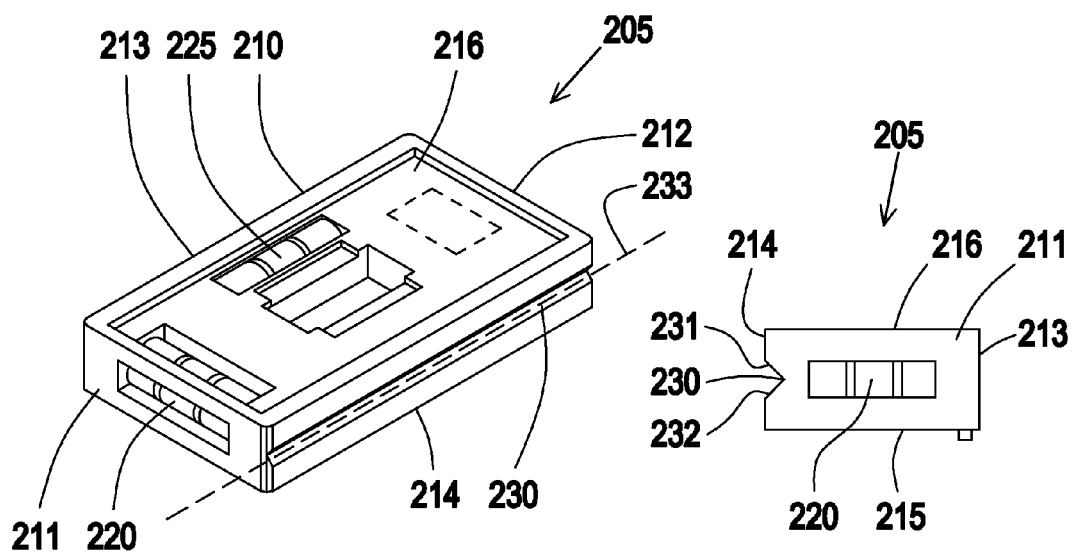
FIG.13
FIG.14

MULTI-FUNCTION ELECTRICIAN LEVEL

This United States utility patent application claims priority on and the benefit of provisional application 61/361,471 filed Jul. 5, 2010, the entire contents of which are hereby incorporated herein by reference.

BACKGROUND OF THE INVENTION

1. Field of the Invention

The present invention relates to a multi-function electrician level and in particular to a tool having opposed functional faces used to mate with electrical outlets and switches to achieve a level mounting of the electrical outlet and switches, respectively.

2. Description of the Related Art

Electric outlets come in many shapes and sizes. However, some are more common than others. For example, in a home environment, the most common types of electric outlets are double three prong outlets, light switches, and rectangular outlets. The rectangular outlets commonly have depressible buttons, such as those in GFCI outlets.

It is customary to attempt to level electrical outlets during installation. In the most basic sense, the outlet level is approximated without the use of tools. While easy, this method yields unsatisfactory results. In this regard, many tools have been developed over the years aiming to achieve quick and easy leveling of electric outlets. Some examples include:

U.S. Pat. No. (hereafter "USPN") 7,032,297 to Cahill et al. titled Apparatus for Installing an Electrical Wall Switch Fixture. This patent shows an apparatus used for installation of wall-mounted electrical switches having a multi-function tool. The tool is provided, in the form of an insulated handle that is detachably engaged with a wall switch. The wall switch device is temporarily attached to a switch fixture using one or more magnets. The tool further includes built-in electrical wire measuring, stripping and bending structures. While perhaps useful for its intended purposes, this patent does not appear to be practical with a wide variety of outlet types.

U.S. Pat. No. 6,818,824 to Marcou et al. is titled Wiring Device Ganging Tool. This patent shows a ganging tool for adjusting the position of a pair of ganged wiring devices such as duplex receptacles, toggle, and decorator type switches on a mounting, e.g., an electrical box. The ganging tool has a frame having a pair of apertures for receiving different kinds of wiring devices and holding them in place while the ganging tool adjusts the position of the wiring devices. The ganging tool also has rotatable toggle adaptors that allow the ganging tool to be used to position both toggle type wiring devices and non-toggle type wiring devices. The ganging tool further has a leveling means for determining the level of the wiring devices. Also, tool cutouts on the frame of the ganging tool allow the ganging tool to be used with power tools in conjunction with positioning and affixing wiring devices on a mounting.

U.S. Pat. No. 6,003,234 to Seibert is titled Receptacle Level. This patent teaches a receptacle level that simulates a male electrical plug and also contains a liquid bubble level such that when the device is plugged into an electrical wall outlet, proper orientation of the wall outlet can be obtained by reading the bubble level. The receptacle level includes tapered male plugs and fits within coverplate clearances as are typically used with the electrical wall outlet to be leveled. This device simplifies the leveling of electrical wall outlets during installation. One drawback with the approach used in this patent is that there can be a large degree of play between the male plug and the outlet, which can yield unsatisfactory results.

U.S. Pat. No. 5,831,130 to MacDowell is titled Electrical Gem Box Leveling Template. As the name suggest the invention described is a template that is abutable against a wall and is utilized for marking a position on the wall at which a gem box is to be mounted in the wall that is between studs in the wall. The template includes a plate, a first spirit level, and a second spirit level. The first spirit level is disposed on the plate and assures horizontal leveling of the electrical gem box leveling template. And, the second spirit level is disposed on the plate and assures vertical leveling of the electrical gem box leveling template. While useful for its intended purpose, this patent does not address the problems with leveling the outlets themselves.

U.S. Pat. No. 5,505,001 to Schaver, Jr. is titled Switch Level. The patent shows a tool for aiding in the leveling of electrical switches. This tool rests on the top portion of the rim around the toggle of single, and three and four-way switches that have a metal mounting bracket. This tool holds itself to the switch so that the user has use of both hands for adjusting and fastening purposes. This patent may be useful for its intended purposes, but it is not useful for a variety of different outlet types.

U.S. Pat. No. 3,279,080 to Stepshinski is titled Gang Outlet Template. This patent appears to be limited to gang or multiple outlet devices.

None of these devices have opposed functional faces used for leveling different types of electric outlets.

None of these devices have opposed faces that have perimeter walls that accurately engage electric outlets to provide reliable and easy results.

None of these devices have levels that are readable from three different surfaces.

Thus there exists a need for a multi-function electrician level that solves these and other problems.

SUMMARY OF THE INVENTION

The present invention relates to a multi-function electrician level and in particular to a tool having opposed functional faces used to mate with electrical outlets and switches to achieve a level mounting of the electrical outlets and switches, respectively. In one embodiment, the body has a first face enabling the tool to level either a switch or a dual three-prong outlet. A second face can be used to level a rectangular outlet, such as a GFCI outlet. In this regard, the second face can have depressions providing clearance to reset buttons. Both faces have walls that mate with the respective type of outlet. The tool can also be used as a traditional level. Levels are provided on two perpendicular surfaces, and are observable through both faces. A laser projector can be provided for fanning a leveling line outward from the tool. A light such as a LED light can also be provided for use as a flashlight. The light can also illuminate the levels.

According to one advantage of the present invention, the body has opposed faces that each respectively used with outlets of different types.

According to another advantage of the present invention, the tool is compact. This allows to tool to be used without interference from drywall or other wall surfaces.

According to a further advantage of the present invention, the tool can perform at least six functions, namely alignment of outlets, switches, rectangular outlets, traditional side leveling, laser projecting and illuminations. This allows the user to accurately align many types of outlets with a single tool, and hence reduce the number of tools transported to each site.

According to still further advantage of the present invention, each face has a sidewall that engages the outlet. This allows the user to quickly and accurately align the outlet.

According to a still further advantage yet of the present invention, the structure of the tool is robust and does not have moving parts which are susceptible to damage and premature failure.

According to a still further advantage yet of the present invention, the tool face designed for rectangular outlets has depressions which provide clearance for typical reset buttons.

According to another advantage of the present invention, the tool can have flat sides and a flat bottom which enable the tool to be used as a traditional level.

According to a still further advantage yet of the present invention, the tool has a light. The light can be used in one embodiment as a flashlight to illuminate the workspace. In a second embodiment, the light can illuminate the levels, and in particular to allow the user to locate the air bubble within the fluid.

According to a still further advantage yet of the present invention, the levels are viewable from both faces, as well as from the top or side of the tool. This allows the user to quickly and easily determine the level of the tool regardless of viewing angle.

According to a still further advantage of the present invention, tabs can be provided along the perimeter of depressions in the faces to accommodate a wider tolerance of outlet types and also to facilitate connection to and removal from the outlets.

According to a still further advantage yet of the present invention, the body can be formed of two pieces to facilitate manufacturing. The pieces can each have ribs that are perpendicular to the faces to facilitate using the sides of the tool for side leveling purposes.

According to a still further advantage yet of the present invention, one of the sides can have a channel therein which can be useful for pipe leveling.

Other advantages, benefits, and features of the present invention will become apparent to those skilled in the art upon reading the detailed description of the invention and studying the drawings.

BRIEF DESCRIPTION OF THE DRAWINGS

FIG. 3 is an alternative perspective view showing the second face of the present invention illustrated in FIG. 2.

FIG. 4 is a view showing the first face of the present invention illustrated in FIG. 1.

FIG. 7 is an opposed side view of an embodiment of the present invention.

FIG. 8 is a top view of an embodiment of the present invention.

FIG. 9 is a bottom view of an embodiment of the present invention.

FIG. 12 is a second perspective view showing the second face of the alternative embodiment illustrated in FIG. 10.

FIG. 13 is a perspective view showing the second face of a further alternative embodiment of the present invention.

FIG. 14 is a top view of the alternative embodiment illustrated in FIG. 13.

DETAILED DESCRIPTION OF PREFERRED EMBODIMENTS

Figure 1:
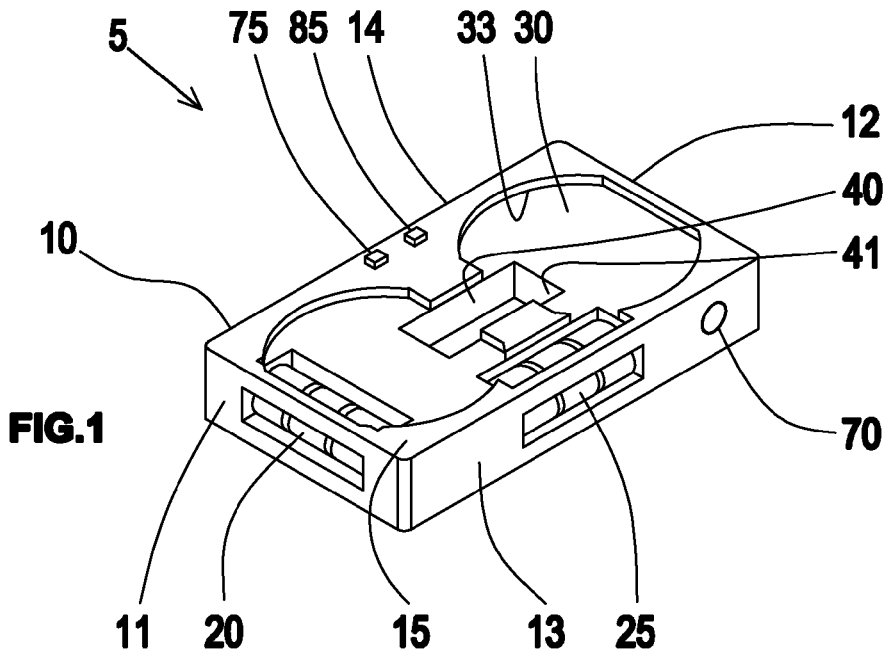
FIG. 1 is a perspective view showing an embodiment of a first face of the present invention.

While the invention will be described in connection with several preferred embodiments, it will be understood that it is not intended to limit the invention to those embodiments. On the contrary, it is intended to cover all alternatives, modifications and equivalents as may be included within the spirit and scope of the invention as defined by the appended claims.

Looking briefly at FIGS. 1-9, it is seen that a preferred embodiment of the present invention. The tool 5 is seen to have a body 10 with a top 11, a bottom 12, sides 13 and 14 and opposed faces 15 and 16. The top 11, bottom 12 and sides 13 and 14 generally define a rectangular perimeter shape, with the surface of the top 11 being preferably parallel with the surface of the bottom 12, and the surface of side 13 being preferably parallel with the surface of bottom 14. Faces 15 and 16 each lie in planes that are preferably parallel to each other and perpendicular to the top 11, bottom 12, side 13 and side 14. The tool 5 can be made of many materials. However, plastics are a preferred material due to weight, durability and ease of manufacture concerns. It is appreciated that the tool 5 can have an exterior shape that is different than the illustrated shape without departing from the broad aspects of the present invention.

Looking now specifically at FIGS. 1-3 and 8, it is seen that a level 20 is provided. A preferred level as used with the present invention is a vial containing an air bubble immersed in a liquid. However, it is appreciated that other types of levels could be used without departing from the broad aspects of the present invention. The level 20 is preferably recessed within the top 11 of the body 10. Level 20 has an air bubble that is centrally located when the body 11 is vertically leveled. The level 20 is preferably observable or viewable from the front face 15 and rear face 16, as well as from the top 11 of the body 10. The level can be permanently connected to the body 10 with any type of suitable adhesive or mechanical fastener.

Looking now specifically at FIGS. 1-3 and 6, it is seen that a level 25 is provided. The level 25 is preferably recessed within the side 13 of the body 10. Level 25 has an air bubble that is centrally located when the body 11 is horizontally leveled. The level 25 is preferably observable or viewable from the front face 15 and rear face 16, as well as from the side 13 of the body 10. The level can be permanently connected to the body 10 with any type of suitable adhesive or mechanical fastener.

Looking now at FIGS. 1 and 4, it is seen that a double outlet aligner 30 is provided on face 15. The double outlet aligner 30 has a top depression 31 and a bottom depression 32, together defined by a perimeter wall 33. The aligner 30 mates with a double three prong wall outlet, and can be used to level or align the outlet relative the wall of the building. This is accomplished as the perimeter wall 33 abuts the outer perimeter of the double outlet. The double outlet can hence be aligned vertically or horizontally, depending on the specification of the job requirement. It is appreciated that the tool 5 is useful to align gang outlets as well.

Keeping with FIGS. 1 and 4, it is seen that a switch aligner 40 is also provided on face 15. The switch aligner 40 has a perimeter wall 41 that engages the outside rectangular perimeter of a wall switch. The switch aligner 40 preferably extends from face 15 through the body 10 and is open to face 16 to provide clearance for the switch. It is appreciated that the tool 5 is useful for multi-switch electric components as well as single switch components.

Figure 2:
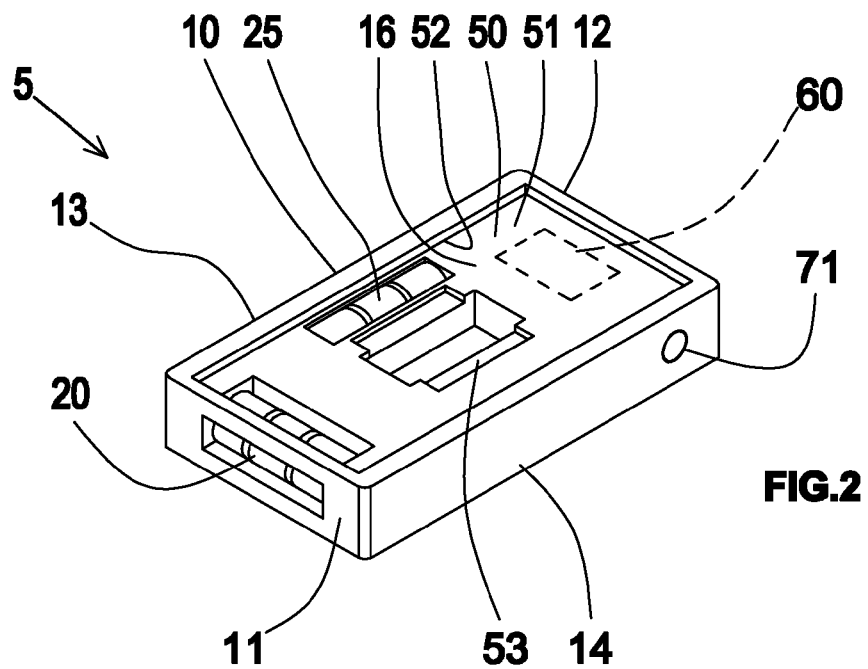
FIG. 2 is a perspective view showing an embodiment of a second face of the present invention.
Figure 5:
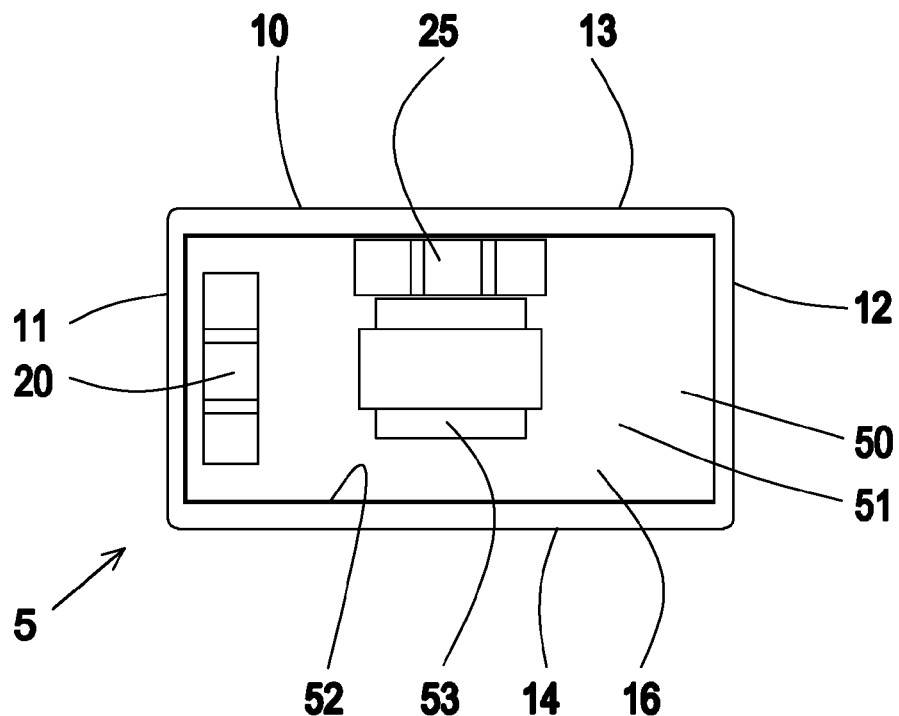
FIG. 5 is a view showing the second face of the present invention illustrated in FIG. 2.

Now, turning to FIGS. 2, 3 and 5 in particular, it is seen that a rectangular outlet aligner 50 is provided. The rectangular outlet aligner 50 has a depression 51 with a perimeter wall 52 adapted to mate with rectangular outlets, such as GFCI type outlets. In this regard, a reset button depression 53 is incorporated providing clearance for the reset buttons on the GFCI type outlets. The depression 53 can be rectangular in shape and is preferably centrally aligned on face 16 around switch aligner 40.

Figure 6:
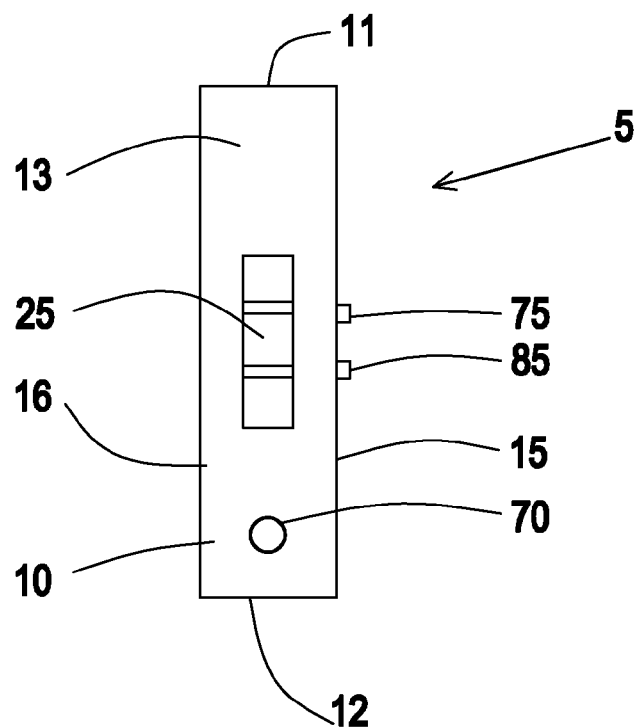
FIG. 6 is side view of an embodiment of the present invention.

A battery 60 is further provided, and can be recessed within the body 10 of the tool 5. The battery 60 can provide power to laser projectors 70 and 71. Laser projector 70 can be embedded within side 13 as seen in FIG. 6, and laser projector 71 can be embedded within side 14 as seen in FIG. 7. The laser projectors 70 and 71 can project a fanning line upon the wall so that other items can be aligned with the fanning line. One or two actuators 750 can further be provided for selectably turning the laser projectors 70 and 71 on and off.

Turning now to FIG. 9, it is seen that a light 80 can further be provided. The light 80 is preferably a LED light, and the light can be embedded into and project from the bottom 12 of the body 10. An actuator 85 can be provided for selectably turning the light 80 on and off. The light 80 (or a different light) can further direct light to project onto the levels 20 and 25 so that the levels can be read in low or no light conditions. This can be accomplished in one embodiment with fiber optic cables.

Figure 10:
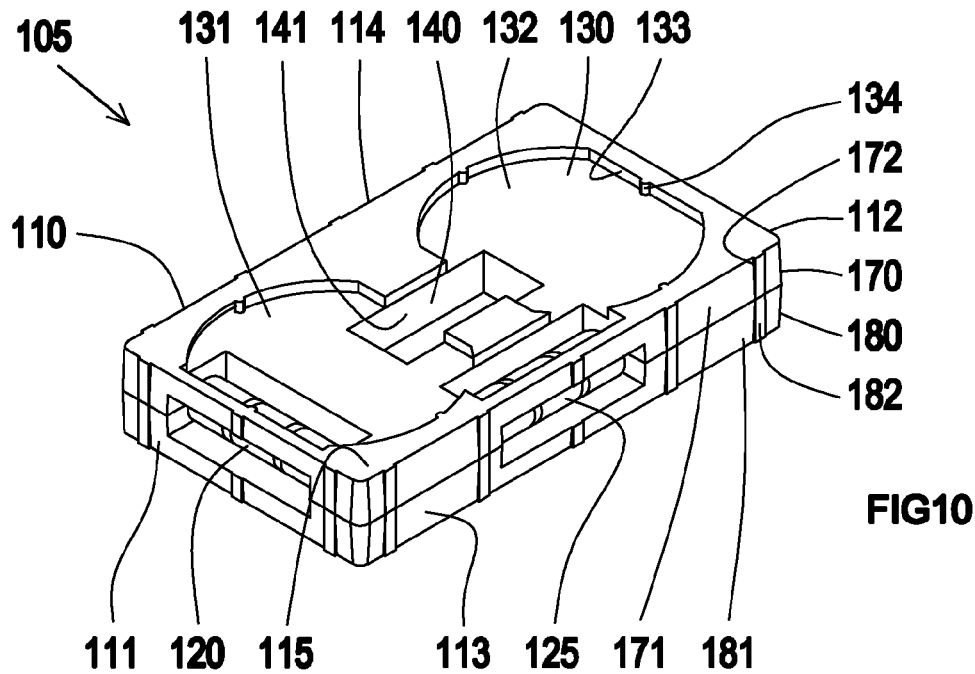
FIG. 10 is a perspective view showing the first face of an alternative embodiment of the present invention.
Figure 11:
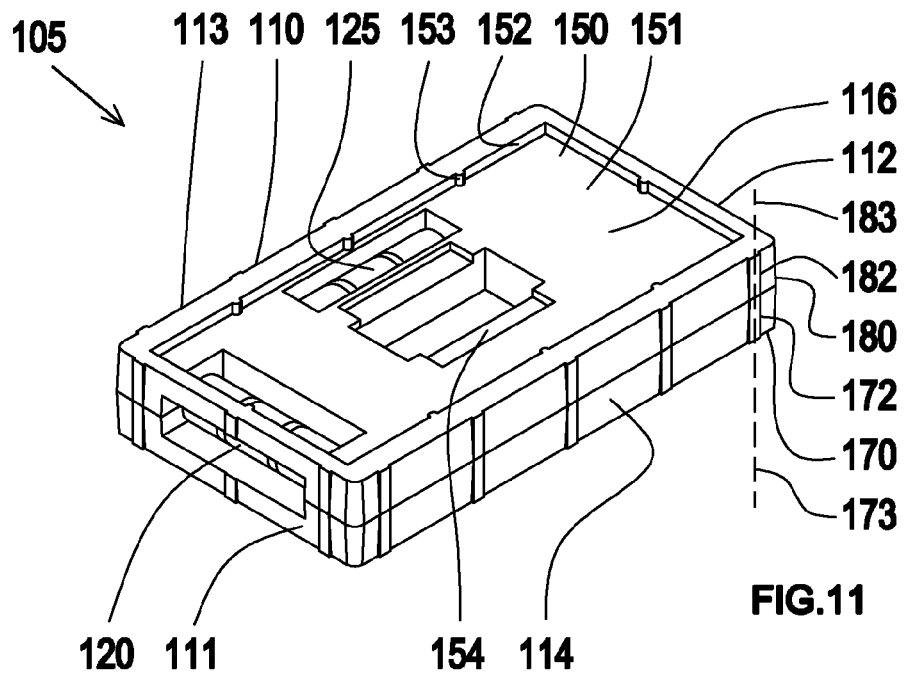
FIG. 11 is a perspective view showing the second face of the alternative embodiment illustrated in FIG. 10.

Turning now to FIGS. 10-12, it is seen that an alternative embodiment is illustrated. The tool 105 is seen to have a body 110 with a top 111, a bottom 112, sides 113 and 114 and opposed faces 115 and 116. The top 111, bottom 112 and sides 113 and 114 generally define a rectangular perimeter shape, with the surface of the top 111 being opposed with the surface of the bottom 112, and the surface of side 113 being opposed with the surface of bottom 114. Faces 115 and 116 each lie in planes that are preferably parallel to each other and are approximately perpendicular to the top 111, bottom 112, side 113 and side 114. The tool 105 can be made of many materials. However, plastics are a preferred material due to weight, durability and ease of manufacture concerns. It is appreciated that the tool 105 can have an exterior shape that is different than the illustrated shape without departing from the broad aspects of the present invention.

A level 120 is provided. The level 120 is preferably recessed within the top 111 of the body 110. Level 120 has an air bubble that is centrally located when the body 111 is vertically leveled. The level 120 is preferably observable from the front face 115 and rear face 116, as well as from the top 111 of the body 110. The level can be permanently connected to the body 110 with any type of suitable adhesive or mechanical fastener.

A second level 125 is further provided. The level 125 is preferably recessed within the side 113 of the body 110. Level 125 has an air bubble that is centrally located when the body 111 is horizontally leveled. The level 125 is preferably observable from the front face 115 and rear face 116, as well as from the side 113 of the body 110. The level can be permanently connected to the body 110 with any type of suitable adhesive or mechanical fastener.

A double outlet aligner 130 is provided on face 115. The double outlet aligner 130 has a top depression 131 and a bottom depression 132, together defined by a perimeter wall 133. The perimeter wall has tabs 134 preferably integrated therein which project inward from the perimeter wall 133. The tabs can be either rigid or flexible. In the preferred embodiment, there are three tabs projecting from the perimeter wall section for each of the double outlet, totaling six tabs. However, it is preferred that more or fewer may be used without departing from the broad aspects of the present invention. The aligner 130 mates with a double three prong wall outlet, and can be used to level or align the outlet relative the wall of the building. This is accomplished as the tabs 134 of the perimeter wall 133 abut the outer perimeter of the double outlet. The tabs 134 are useful to facilitate the placing onto and the removal from the outlets. The double outlet can hence be aligned vertically or horizontally, depending on the specification of the job requirement. It is appreciated that the tool 105 is useful to align gang outlets as well.

A switch aligner 140 is also provided on face 115. The switch aligner 140 has a perimeter wall 141 that engages the outside rectangular perimeter of a wall switch. The switch aligner 140 preferably extends from face 115 through the body 110 and is open to face 116 to provide clearance for the switch. It is appreciated that the tool 105 is useful for multi-switch electric components as well as single switch components.

A rectangular outlet aligner 150 is provided. The rectangular outlet aligner 150 has a depression 151 with a perimeter wall 152. Tabs 153 are preferably integrated into the perimeter wall 152 and extend inward therefrom. In the preferred embodiment, there are three tabs projecting from the perimeter wall section on each side, and one tab on each end, totaling eight tabs. However, it is preferred that more or fewer may be used without departing from the broad aspects of the present invention. The tabs 153 are adapted to mate with or allow the tool to be placed on rectangular outlets, such as GFCI type outlets. In this regard, a reset button depression 154 is incorporated providing clearance for the reset buttons on the GFCI type outlets. The depression 154 can be rectangular in shape.

The body 110 can be formed from two pieces, namely, a first piece 170 and a second piece 180, which are fastened or fixed together. The first piece 170 has a side wall 171 that is narrower near the face 115 and wider remote from the face. Ribs 172 are provided, and each has a rib has a longitudinal axis 173. The rib longitudinal axis 173 is preferably perpendicular to the plane of face 115. The second piece 180 also has a side wall 181 that is narrower near face 116 and wider remote from the face. Ribs 182 are provided, and each rib 182 has a longitudinal axis 183. The rib longitudinal axis 183 is preferably perpendicular to the plane of face 115. Longitudinal axis 173 and longitudinal axis 183 are preferably collinear when the first piece 170 and second piece 180 are connected. It is preferred that the ribs 172 of piece 170 align with ribs 182 of piece 180, wherein the ribs provide a several areas on the top, bottom, and sides of the body 10 that are perpendicular to the first face 115 and second face 116 so that the levels 120 and 125 are accurate when using the tool 105 against a surface. There are preferably five ribs on the sides 113 and 114 of the body 110, and three tabs on the top 111 and bottom 112 of the body. Yet, it is appreciated that more or fewer ribs can be used without departing from the broad aspects of the present invention.

It is appreciated that the first piece 170 and second piece 180 can enclose an interior that can be used to hold electronics and other items such as batteries, lights, lasers and the like.

Turning now to FIGS. 13 and 14, it is seen that a further alternative embodiment is illustrated. The tool 205 is seen to have a body 210 with a top 211, a bottom 212, sides 213 and 214 and opposed faces 215 and 216. The top 211, bottom 112 and sides 213 and 214 generally define a rectangular perimeter shape, with the surface of the top 211 being generally parallel with the surface of the bottom 212, and the surface of side 213 being generally parallel with the surface of bottom 214. Faces 215 and 216 each lie in planes that are preferably parallel to each other and are approximately perpendicular to the top 211, bottom 212, side 213 and side 214. The tool 205 can be made of many materials. However, plastics are a preferred material due to weight, durability and ease of manufacture concerns. It is appreciated that the tool 105 can have an exterior shape that is different than the illustrated shape without departing from the broad aspects of the present invention.

A level 220 is provided. The level 220 is preferably recessed within the top 211 of the body 210. Level 220 has an air bubble that is centrally located when the body 211 is vertically leveled. The level 220 is preferably observable from the front face 215 and rear face 216, as well as from the top 211 of the body 210. The level can be permanently connected to the body 210 with any type of suitable adhesive or mechanical fastener.

A second level 225 is further provided. The level 225 is preferably recessed within the side 213 of the body 210. Level 225 has an air bubble that is centrally located when the body 211 is horizontally leveled. The level 225 is preferably observable from the front face 215 and rear face 216, as well as from the side 213 of the body 210. The level can be permanently connected to the body 210 with any type of suitable adhesive or mechanical fastener.

Side 214 can contain a channel 230 therein that spans the length of the side 214 between the top 211 and bottom 212 of the tool. The channel 230 can be formed of two intersecting walls 231 and 232, respectively, and accordingly can have a generally V-shaped profile. An axis 233 is provided along the channel. The axis 233 is preferably parallel to the side 214. The channel is useful when the tool is to be placed adjacent a pipe or the like so that the level of the pipe can be determined.

Thus it is apparent that there has been provided, in accordance with the invention, a multi-function electrician level that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A tool comprising:
a body with a body top, a body bottom, a body first side and a body second side;
a first face having a first face depression, said first face depression having a first face depression perimeter wall that is adapted to be placed on a first outlet type;
a second face having a second face depression, said second face depression having a second face depression perimeter wall that is adapted to be placed on a second outlet type;
a first level near said body top; and
a second level near said body first side.

2. The tool of claim 1 wherein said first face depression perimeter wall is adapted to be placed on a double outlet.

3. The tool of claim 2 wherein said first face depression perimeter wall comprises a plurality of first face depression perimeter wall tabs, said first face depression perimeter wall tabs projecting inward from said first face depression perimeter wall.

4. The tool of claim 3 wherein said first face depression perimeter wall comprises six first face depression perimeter wall tabs.

5. The tool of claim 1 wherein said second face depression perimeter wall is adapted to be placed on a rectangular outlet.

6. The tool of claim 5 wherein said second face depression perimeter wall comprises a plurality of second face depression perimeter wall tabs, said second face depression perimeter wall tabs projecting inward from said second face depression perimeter wall.

7. The tool of claim 6 wherein said second face depression perimeter wall comprises eight first face depression perimeter wall tabs.

8. The tool of claim 5 wherein said tool further comprises a switch aligner centrally located through said tool between said first face and said second face.

9. The tool of claim 8 wherein said second face has a reset button depression next to said switch aligner.

10. The tool of claim 1 wherein:
said body top is parallel with said body bottom; and
said body first side is parallel with said body second side, whereby said tool can be used as a leveling device on any of said body top, said body bottom, said body first side and said body second side.

11. The tool of claim 1 wherein said body further comprises:
a first piece, said first piece having a first piece side wall with first piece side wall ribs thereon, each of said first piece side wall ribs having a first piece side wall rib longitudinal axis; and
a second piece, said second piece having a second piece side wall with second piece side wall ribs thereon, each of said second piece side wall ribs having a second piece side wall rib longitudinal axis,
wherein:
said first piece is connectable with said second piece; and
said first piece side wall rib longitudinal axis is parallel with said second piece side wall rib longitudinal axis when said first piece is connected to said second piece.

12. The tool of claim 1 wherein said body first side has a channel formed therein spanning between said body top and said body bottom.

13. The tool of claim 1 further comprising a battery and a laser projector, said laser projector providing a fanning line from said tool.

14. The tool of claim 1 further comprising a battery, a light and an actuator, said actuator being used to selectably turn on and off said light.

15. The tool of claim 1 wherein:
said first level is observable from said first face, said second face and said body top; and
said second level is observable from said first face, said second face and said body first side.

16. A tool comprising:
a body with a body top, a body bottom, a body first side and a body second side, said body top, said body bottom, said body first side and said body second side defining a generally rectangular body perimeter;

a first face having a first face depression, said first face depression having a first face depression perimeter wall that is adapted to be placed on a first outlet type;

a second face having a second face depression, said second face depression having a second face depression perimeter wall that is adapted to be placed on a second outlet type;

a first level near said body top that is observable from said first face, said second face and said body top; and a second level near said body first side that is observable from said first face, said second face and said body first side.

17. The tool of claim 16 wherein said body further comprises:

a first piece, said first piece having a first piece side wall with first piece side wall ribs thereon, each of said first piece side wall ribs having a first piece side wall rib longitudinal axis; and a second piece, said second piece having a second piece side wall with second piece side wall ribs thereon, each of said second piece side wall ribs having a second piece side wall rib longitudinal axis, wherein:
    said first piece is connectable with said second piece; and
    said first piece side wall rib longitudinal axis is parallel with said second piece side wall rib longitudinal axis when said first piece is connected to said second piece.

18. The tool of claim 16 wherein:

said first face depression perimeter wall is adapted to be placed on a double outlet and said first face depression perimeter wall comprises a plurality of first face depression perimeter wall tabs, said first face depression perimeter wall tabs projecting inward from said first face depression perimeter wall; and said second face depression perimeter wall is adapted to be placed on a rectangular outlet and said second face depression perimeter wall comprises a plurality of second face depression perimeter wall tabs, said second face depression perimeter wall tabs projecting inward from said second face depression perimeter wall.

19. A tool comprising:

a body with a body top, a body bottom, a body first side and a body second side;

a first face having a first face depression, said first face depression having a first face depression perimeter wall that is adapted to be placed on a double outlet;

a second face having a second face depression, said second face depression having a second face depression perimeter wall that is adapted to be placed on rectangular outlet, wherein said second face is parallel to said first face;

a first level near said body top that is observable from said first face, said second face and said body top; and a second level near said body first side that is observable from said first face, said second face and said body first side.

20. The tool of claim 19 wherein said tool further comprises a switch aligner centrally located through said tool between said first face and said second face; and said second face has a reset button depression next to said switch aligner.

* * * * *